(12) United States Patent
Li et al.

(10) Patent No.: US 11,652,274 B1
(45) Date of Patent: May 16, 2023

(54) MILLIMETER WAVE WIRELESS CONNECTOR CHIP, WIRELESS CONNECTOR AND SIGNAL TRANSMISSION SYSTEM

(71) Applicant: DECO SEMICONDUCTOR (SHENZHEN) CO., LIMITED, Guangdong (CN)

(72) Inventors: Cheng Li, Guangdong (CN); Wenxue Jin, Guangdong (CN)

(73) Assignee: DECO SEMICONDUCTOR (SHENZHEN) CO., LIMITED, Shenzhen (CN)

(*) Notice: Subject to any disclaimer, the term of this patent is extended or adjusted under 35 U.S.C. 154(b) by 0 days.

(21) Appl. No.: 17/956,851

(22) Filed: Sep. 30, 2022

Related U.S. Application Data

(63) Continuation of application No. PCT/CN2022/078226, filed on Feb. 28, 2022.

(30) Foreign Application Priority Data

Jan. 18, 2022 (CN) .......................... 202210054502.7

(51) Int. Cl.
  *H01Q 1/22* (2006.01)
  *H04B 1/38* (2015.01)

(52) U.S. Cl.
  CPC ............. *H01Q 1/2283* (2013.01); *H04B 1/38* (2013.01)

(58) Field of Classification Search
  CPC ............................... H01Q 1/2283; H04B 1/38
  USPC .......................... 343/700 MS; 341/100, 101
  See application file for complete search history.

(56) References Cited

U.S. PATENT DOCUMENTS

2009/0033359 A1* 2/2009 Rofougaran ..... H03K 19/17744
  326/39

* cited by examiner

*Primary Examiner* — Peguy Jean Pierre

(57) ABSTRACT

The present invention discloses a millimeter wave wireless connector chip, a wireless connector and a signal transmission system, wherein the chip comprises a data interface module, a serial-to-parallel conversion module, a millimeter wave transceiving module and a state machine control module; the data interface module is configured for receiving or sending a data signal; the serial-to-parallel conversion module is configured for converting a parallel signal into a serial signal and sending the serial signal to a wireless transceiving module, and is also configured for receiving the serial signal sent by the millimeter wave transceiving module and converting the received serial signal into a parallel signal; the millimeter wave transceiving module is configured for transceiving data by millimeter waves; and the state machine control module is configured for controlling the serial-to-parallel conversion module and the millimeter wave transceiving module to perform data reception, data sending or data dormancy.

6 Claims, 3 Drawing Sheets

MILLIMETER WAVE WIRELESS CONNECTOR CHIP, WIRELESS CONNECTOR AND SIGNAL TRANSMISSION SYSTEM

CROSS REFERENCE TO RELATED APPLICATIONS

The present application is a Continuation Application of PCT Application No. PCT/CN2022/078226 filed on Feb. 28, 2022, which claims the benefit of Chinese Patent Application No. 202210054502.7 filed on Jan. 18, 2022. All the above are hereby incorporated by reference in their entirety.

TECHNICAL FIELD

The present invention relates to the field of wireless communications, and more particularly, to a millimeter wave wireless connector chip, a wireless connector, and a signal transmission system.

BACKGROUND ART

In the existing multi-screen display apparatus, a back panel is usually connected with a plurality of display modules, and the back panel and the display modules are usually connected with a communication line. Also, a cable such as a power line and a data line added results in a large number of cables, which is complicated in connection. Meanwhile, the connectors of the cables occupy a lot of space of the back panel or the display module. Therefore, the wired connection mode is required to be improved, and a wireless connector is needed for data transmission.

Current wireless connectors typically employ an integration scheme of multiple chips, such as a radio transceiver chip and a baseband processing chip. However, they are costly and have complex implementation.

SUMMARY OF THE INVENTION

The technical problem to be solved by the present invention is directed to provide a millimeter wave wireless connector chip, a wireless connector and a signal transmission system, which can reduce the cost and complexity of implementing a wireless connection function.

In order to solve the above technical problem, the technical solution adopted by the present invention is a millimeter wave wireless connector chip, comprising a data interface module, a serial-to-parallel conversion module, a millimeter wave transceiving module and a state machine control module, wherein the data interface module, the serial-to-parallel conversion module and the millimeter wave transceiving module are successively connected, and the state machine control module is respectively connected to the serial-to-parallel conversion module and millimeter wave transceiving module;

The data interface module is configured for receiving or sending a data signal.

The serial-to-parallel conversion module is configured for converting a parallel signal into a serial signal and sending the serial signal to a wireless transceiving module, and is also configured for receiving the serial signal sent by the millimeter wave transceiving module and converting the received serial signal into a parallel signal;

The millimeter wave transceiving module is configured for transceiving data by millimeter waves.

The state machine control module is configured for controlling the serial-to-parallel conversion module and the millimeter wave transceiving module to perform data reception, data sending or data dormancy.

The invention also proposes a wireless connector comprising the millimeter wave wireless connector chip as described above.

The invention also proposes a signal transmission system comprising two millimeter wave wireless connector chips, which are a first millimeter wave wireless connector chip and a second millimeter wave wireless connector chip respectively, and further comprising a first device and a second device, wherein the first device is connected to the first millimeter wave wireless connector chip, and the second device is connected to the second millimeter wave wireless connector chip, and the first millimeter wave wireless connector chip and the second millimeter wave wireless connector chip are wirelessly connected.

The advantageous effect of the present invention is that the cost and complexity of implementing the wireless connector function can be reduced by integrating the wireless transceiving function and the baseband processing function into the same chip to implement the wireless connector function.

DESCRIPTION OF REFERENCE NUMERALS

1. data interface module; 2. serial-to-parallel conversion module; 3 millimeter wave transceiving module; 4. state machine control module; 5. control interface module; 6. register module; 7. judgement and selection module; 8. bridging module; 9. packaging module; 10. unpack distribution module.

DETAILED DESCRIPTION OF THE INVENTION

In order to explain the technical contents, the objects, and the effects of the present invention in detail, the following description is made in conjunction with the embodiments and the accompanying drawings.

Figure 1:
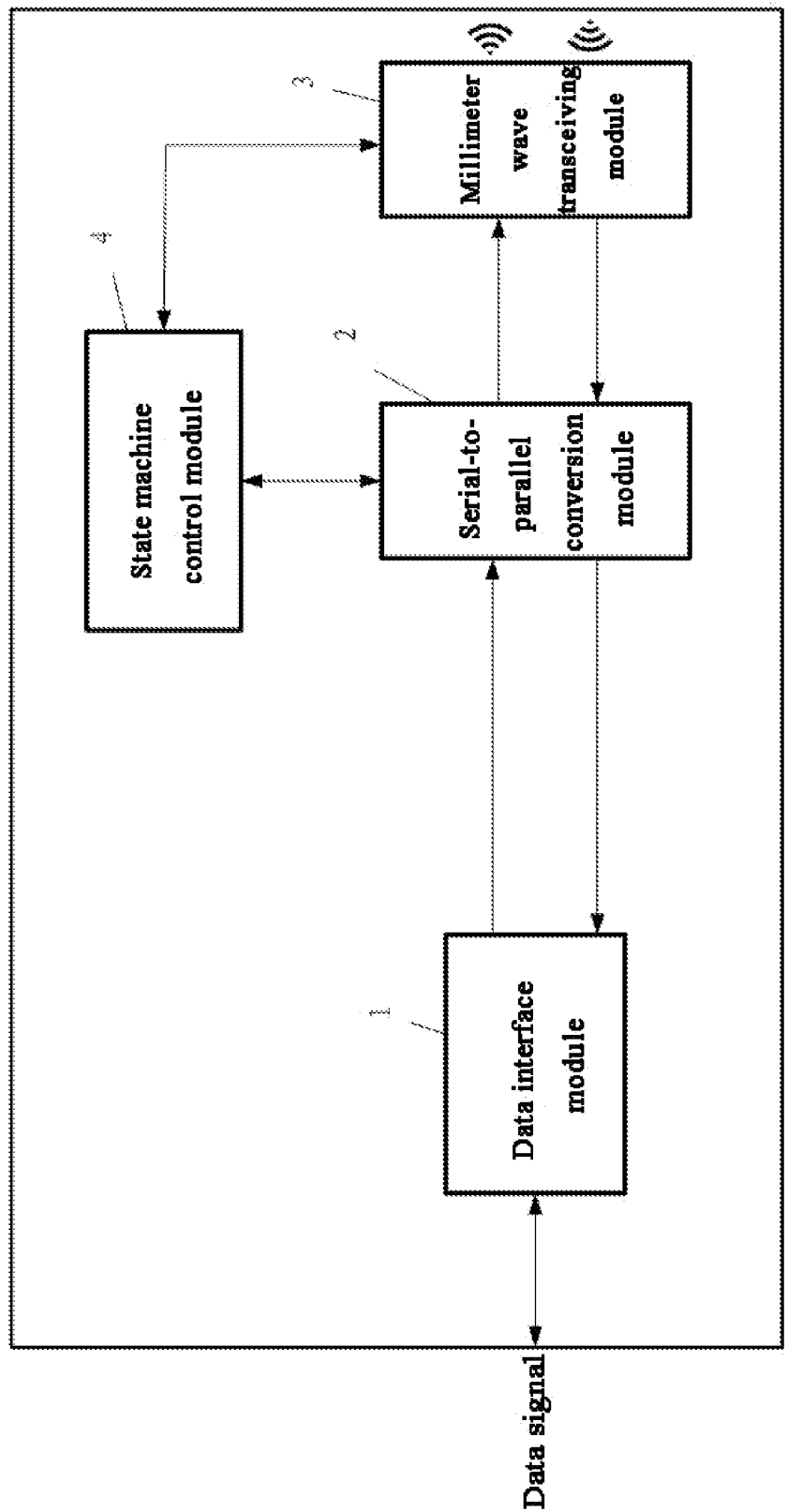
FIG. 1 is a structure diagram of a millimeter wave wireless connector chip according to Embodiment I of the present invention.

With reference to FIG. 1, a millimeter wave wireless connector chip includes a data interface module, a serial-to-parallel conversion module, a millimeter wave transceiving module and a state machine control module, wherein the data interface module, the serial-to-parallel conversion module and the millimeter wave transceiving module are successively connected, and the state machine control module is respectively connected to the serial-to-parallel conversion module and millimeter wave transceiving module.

The data interface module is configured for receiving or sending a data signal.

The serial-to-parallel conversion module is configured for converting a parallel signal into a serial signal and sending the serial signal to a wireless transceiving module, and is also configured for receiving the serial signal sent by the millimeter wave transceiving module and converting the received serial signal into a parallel signal.

The millimeter wave transceiving module is configured for transceiving data by millimeter waves.

The state machine control module is configured for controlling the serial-to-parallel conversion module and the millimeter wave transceiving module to perform data reception, data sending or data dormancy.

As apparent from the above description, the present invention has an advantageous effect in that the cost and complexity of implementing wireless connection functionality may be reduced.

Further, the millimeter wave wireless connector chip further includes a control interface module and a register module, wherein the control interface module is connected to the register module, and the register module is connected to the state machine control module.

The control interface module is configured for receiving or sending a control signal, and the control signal comprises a control signal corresponding to its own chip.

The register module is configured for storing a control signal corresponding to its own chip.

The state machine control module is also configured for performing corresponding configuration according to the control signal in the register module.

It can be seen from the above-mentioned description that the configuration of the millimeter wave wireless connector chip can be realized by providing the control interface module.

Further, the control signal further comprises control signals corresponding to other chips.

The millimeter wave wireless connector chip further includes a judgement and selection module, a bridging module, a packaging module and an unpack distribution module; the control interface module is connected to the judgement and selection module which is respectively connected to the register module and the bridging module; the bridging module is respectively connected to the packaging module and the unpack distribution module; the data interface module is respectively connected to the serial-to-parallel conversion module via the packaging module and the unpack distribution module.

The judgement and selection module is configured for acquiring, from the control signal, a control signal corresponding to the state machine control module of its own chip and sending the same to the register module, acquiring, from the control signal, a control signal corresponding to the control interface module of its own chip and sending the same to the control interface module, and acquiring, from the control signal, a control signal corresponding to other chips and sending the same to the bridging module.

The bridging module is configured for forwarding a control signal.

The packaging module is configured for packaging the control signal and/or the data signal to obtain a parallel signal, and sending the packaged parallel signal to the serial-to-parallel conversion module.

The unpack distribution module is configured for unpacking the parallel signal sent by the serial-to-parallel conversion module to obtain a control signal and/or a data signal, sending the unpacked control signal to the judgement and selection module via the bridging module, and sending the unpacked data signal to the data interface module.

It can be seen from the above description that in addition to the configuration of a near-end millimeter wave wireless connector chip, the configuration of a remote millimeter wave wireless connector chip and a remote device can also be implemented.

The invention also proposes a wireless connector including the millimeter wave wireless connector chip as described above.

The invention also proposes a signal transmission system including two millimeter wave wireless connector chips, which are a first millimeter wave wireless connector chip and a second millimeter wave wireless connector chip respectively, and further including a first device and a second device, wherein the first device is connected to the first millimeter wave wireless connector chip, and the second device is connected to the second millimeter wave wireless connector chip, and the first millimeter wave wireless connector chip and the second millimeter wave wireless connector chip are wirelessly connected.

Embodiment I

Referring to FIG. 1, Embodiment I of the present invention is a millimeter wave wireless connector chip applicable to a wireless connector.

As shown in FIG. 1, the chip includes a data interface module 1, a serial-to-parallel conversion module 2, a millimeter wave transceiving module 3 and a state machine control module 4, wherein the data interface module 1, the serial-to-parallel conversion module 2 and the millimeter wave transceiving module 3 are successively connected to the state machine control module 4 which is respectively connected to the serial-to-parallel conversion module 2 and the millimeter wave transceiving module 3.

In this embodiment, the data interface module 1 is a data interface circuit for receiving or sending a data signal. The serial-to-parallel conversion module 2 is a SERDES (an abbreviation of a serializer (SERializer) and a deserializer (DESerializer)), configured for converting a parallel signal into a serial signal and sending the serial signal to a wireless transceiving module, and is also configured for receiving the serial signal sent by the millimeter wave transceiving module and converting the received serial signal into a parallel signal. The millimeter wave transceiving module 3 is a millimeter wave circuit for transceiving data by millimeter waves. The state machine control module 4 is a state machine control circuit and configured for controlling the serial-to-parallel conversion module and the millimeter wave transceiving module to perform data reception, data sending or data dormancy.

Further, the data interface module is connected to a data signal pin of the chip.

A data signal to be transmitted is written into a data interface module via an input pin in a data signal pin. The data interface module sends the data signal to a serial-to-parallel conversion module. The data signal at this moment is a parallel signal, and then the serial-to-parallel conversion module converts the parallel signal into a serial signal. Finally, the data signal is sent out via a millimeter wave module.

The millimeter wave wireless connector chip may also receive data signals sent by other chips via the millimeter wave module, then send the same to the data interface module after parallel conversion via the serial-to-parallel conversion module, and finally output the same via an output pin in the data signal pin.

This embodiment reduces the cost and complexity of implementing the wireless connection function by integrating the wireless transceiving function and the baseband processing function in the same chip and increasing the data signal interface.

Embodiment II

Figure 2:
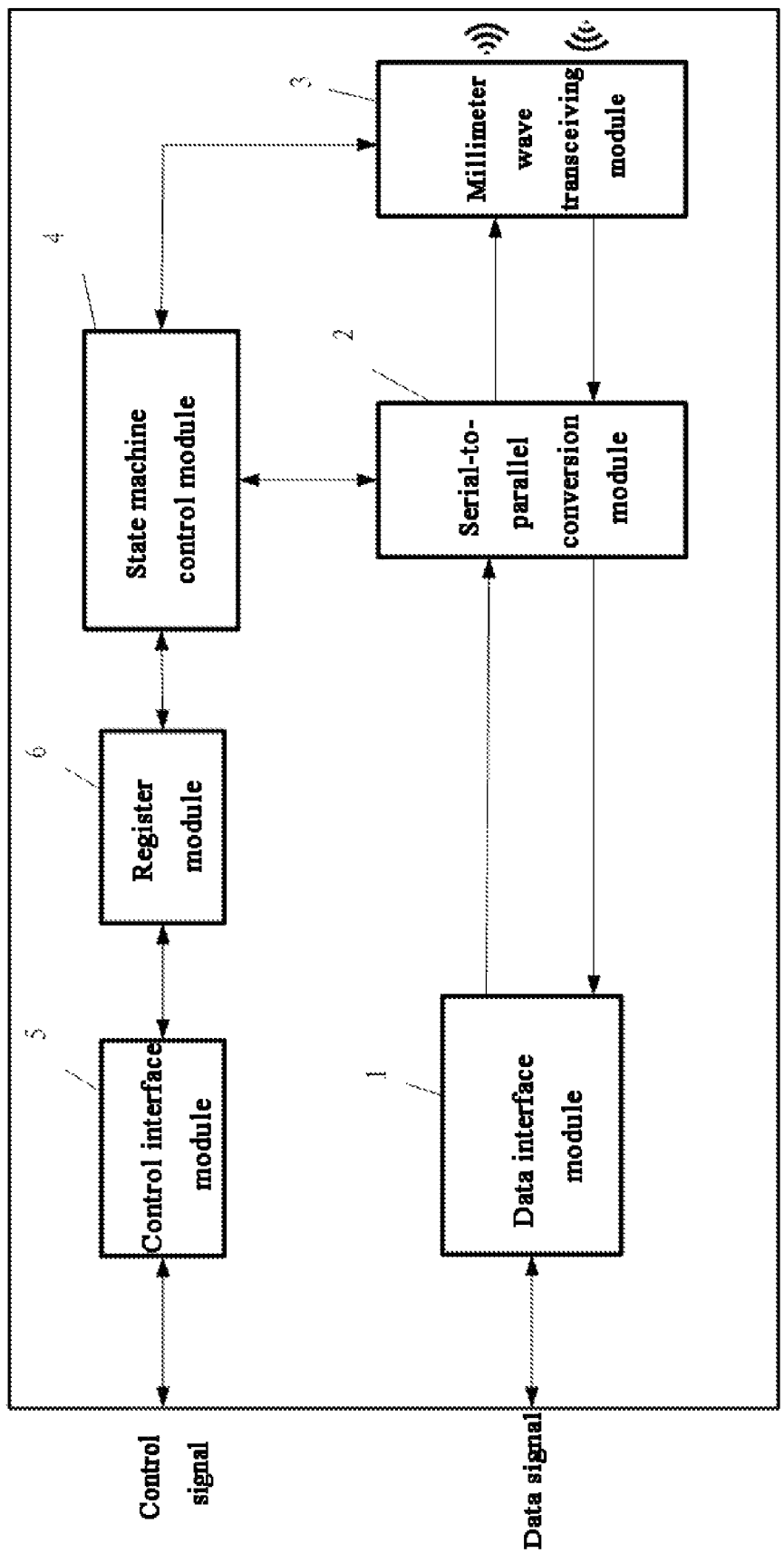
FIG. 2 is a structure diagram of a millimeter wave wireless connector chip according to Embodiment II of the present invention.

With reference to FIG. 2, the present embodiment is a further development of embodiment 1, and the similarities will not be described repeatedly, with the difference in that in the present embodiment, the millimeter wave wireless connector chip further includes a control interface module 5 and a register module 6. The control interface module 5 is connected to the register module 6, and the register module 6 is connected to the state machine control module 4.

In the present embodiment, the control interface module 5 is a control interface circuit for receiving or sending a control signal including a control signal corresponding to its own chip. The register module 6 is a register or a configuration register for storing a control signal corresponding to its own chip. The state machine control module 4 is also configured for performing corresponding configuration according to the control signal in the register module 6. For example, the activation of a chip is performed according to the control signal, or the serial-to-parallel conversion module and the millimeter wave transceiving module are controlled.

Further, the control interface module is connected to the control signal pins of the chip. The control signal may be written to the chip via an input pin in the control signal pin and may be verified by reading the control signal from the chip via an output pin in the control signal pin.

This embodiment is based on Embodiment I, and further provides a control signal interface for realizing the configuration of the millimeter wave wireless connector chip.

Embodiment III

Figure 3:
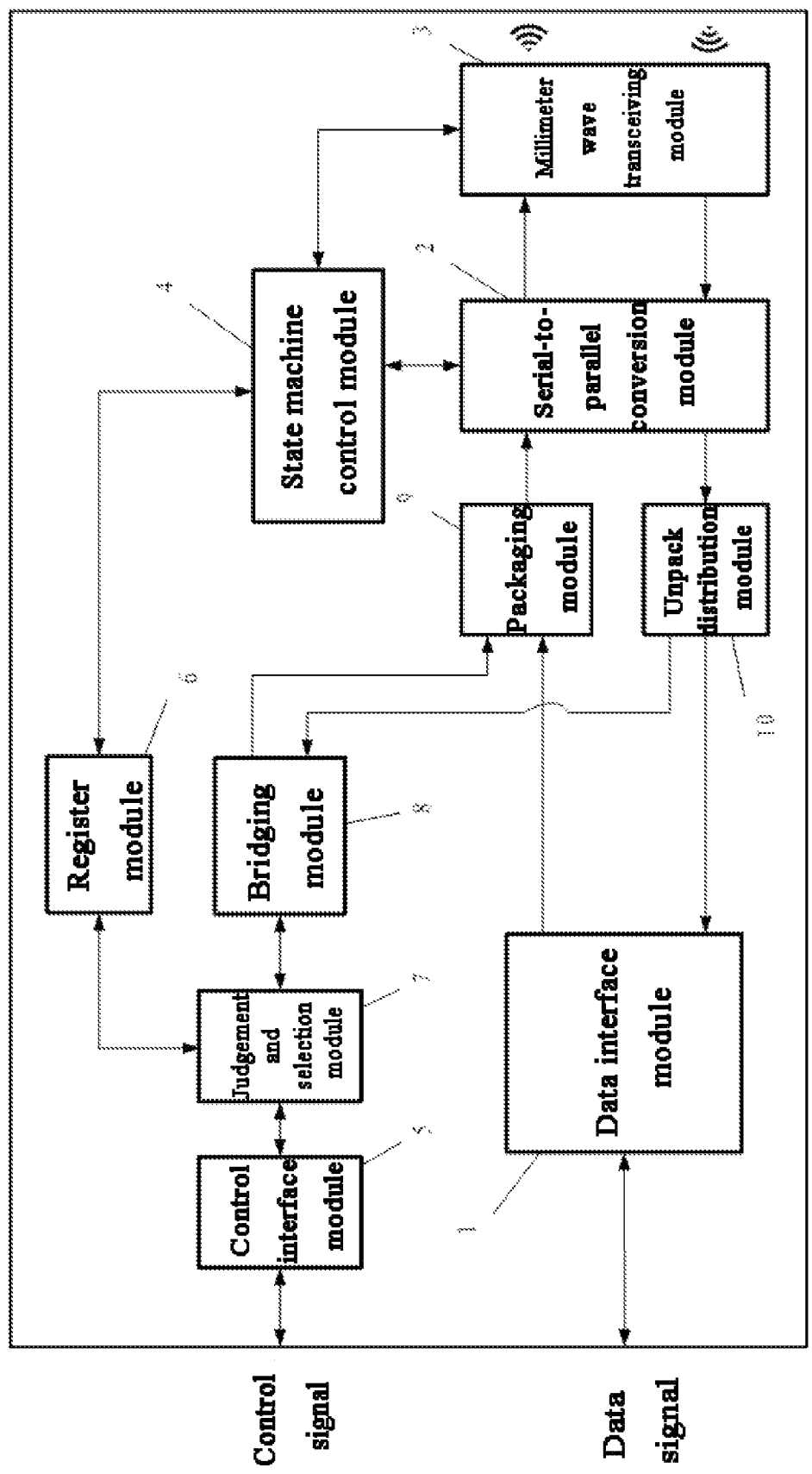
FIG. 3 is a structure diagram of a millimeter wave wireless connector chip according to Embodiment III of the present invention.

With reference to FIG. 3, the present embodiment is a further development of embodiment 2, and the similarities will not be described repeatedly, with the difference in that in the present embodiment, the control signal also includes control signals corresponding to other chips. The millimeter wave wireless connector chip further includes a judgement and selection module 7, a bridging module 8, a packaging module 9 and an unpack distribution module 10. The control interface module 5 is connected to the judgement and selection module 7. The judgement and selection module 7 is respectively connected to the register module 6 and the bridging module 8. The bridging module 8 is respectively connected to the packaging module 9 and the unpack distribution module 10. The data interface module 1 is respectively connected to the serial-to-parallel conversion module 2 via the packaging module 9 and the unpack distribution module 10.

In the present embodiment, the judgement and selection module 7 is a judgement and selection circuit (which can be achieved by a digital circuit) for acquiring a control signal corresponding to a state machine control module of its own chip from a control signal sent by the control interface module 5 and sending the same to the register module 6, acquiring control signals corresponding to other chips from the control signal sent by the control interface module 5 and sending the same to the bridging module 8, and acquiring a control signal corresponding to the control interface module 5 of its own chip from the control signal sent by the bridging module 8 and sending the same to the control interface module 5. The bridging module 8 is a bridging circuit for forwarding a control signal, namely, sending the control signal sent by the control interface module 5 to the packaging module 9, and sending the control signal sent by the unpack distribution module 10 to the judgement and selection module 7. The packaging module 9 is a data packing circuit for packing the control signal and the data signal to obtain a parallel signal, and sending the packaged parallel signal to the serial-to-parallel conversion module 2. The unpack distribution module 10 is an unpack distribution circuit for unpacking the parallel signal sent by the serial-to-parallel conversion module 2 to obtain a control signal and a data signal, sending the unpacked control signal to the judgement and selection module 7 via the bridging module 8, and sending the unpacked data signal to the data interface module 1.

Furthermore, the control signal contains identifiers corresponding to a chip and a module. The judgement and selection module judges which chip or module the control signal corresponds to by the identifier in the control signal. If it is a control signal corresponding to a state machine control module of its own chip, the control signal is sent to the register module. If it is a control signal corresponding to a control interface module of its own chip, the control signal is sent to the control interface module. If it is a control signal corresponding to other chips, the control signal is sent to the bridging module, and then the bridging module forwards the same to the packaging module.

After receiving the control signal corresponding to other chips sent by the bridging module and the data signal sent by the data interface module, the packaging module packages the control signal and the data signal, and sends the packaged signal which is a parallel signal to the serial-to-parallel conversion module. Then the serial-to-parallel conversion module converts the parallel signal into a serial signal, and finally sends the same to another millimeter wave wireless connector chip via the millimeter wave transceiving module.

In another millimeter wave wireless connector chip, after receiving a serial signal via a millimeter wave module, the serial signal is sent to a serial-to-parallel conversion module, and the serial-to-parallel conversion module converts the serial signal into a parallel signal and sends the same to an unpack distribution module. After receiving the parallel signal, the unpack distribution module unpacks the parallel signal to obtain a control signal and a data signal, sends the unpacked control signal to the judgement and selection module via the bridging module, and sends the unpacked data signal to the data interface module. The judgement and selection module judges whether the control signal sent by the bridging module is a control signal corresponding to a state machine control module of its own chip. If so, the control signal is sent to the register module; otherwise, it is judged whether the control signal sent by the bridging module is a control signal corresponding to the control interface module of its own chip. If so, the control signal is sent to the control interface module, and then the control interface module sends the same to a device connected thereto via an output pin in the control signal pin. That is to say, the control signal corresponding to the control interface module of the chip is equivalent to the control signal corresponding to the device connected to the chip.

For example, it is supposed that a device A is connected to a millimeter wave wireless connector chip A (hereinafter referred to as chip A), and a device B is connected to a millimeter wave wireless connector chip B (hereinafter referred to as chip B). Furthermore, the device A is respectively connected to a control signal pin and a data signal pin of the chip A, and the device B is connected to a control signal pin and a data signal pin of the chip B, with a wireless connection between the chip A and the chip B.

The device A can send the data to be transmitted to the chip A via the data signal pin, and the chip A sends the data to be transmitted to the chip B wirelessly, and the chip B then sends the data to be transmitted to the device B via the data signal pin, thereby achieving data signal communication between the device A and the device B.

The device A can also send a control signal to the chip A via the control signal pin, wherein the control signal includes a control signal corresponding to the chip A, and can also include a control signal corresponding to the chip B and a control signal corresponding to the device B. The chip A stores a control signal corresponding thereto into a register module thereof, and wirelessly sends the control signal corresponding to the chip B and the control signal corresponding to the device B to the chip B. After receiving the control signal, the chip B judges that the control signal is a control signal corresponding to its own chip by its own judgement and selection module, and then stores the control signal in its own register module. If it is judged that the control signal is a control signal corresponding to the device B, the control signal is sent to its own control interface module, and is then sent to the device B via an output pin of the control signal pin, thereby achieving the control of the remote chip and the remote device.

That is to say, the chip A, the chip B and the device B can be configured by the device A at the same time. Namely, the chip at the sending end and the chip and the device at the receiving end can be configured by the device at the sending end at the same time, and the device at the receiving end does not need to be provided with a control module, such as a MCU.

In addition to the configuration of the near-end millimeter wave wireless connector chip, the present embodiment may also implement the configuration of the remote millimeter wave wireless connector chip and the remote device.

In summary, the present invention provides a millimeter wave wireless connector chip, a wireless connector and a signal transmission system, wherein the wireless transceiving function and the baseband processing function are integrated in the same chip, and a data signal interface and a control signal interface are added, thereby greatly reducing the cost and complexity of realizing the wireless connection function. Meanwhile, the control of the near-end millimeter wave wireless connector chip can be realized, and the configuration of the remote millimeter wave wireless connector chip and the remote device can also be realized, so that the remote device does not need to be provided with a control module, further reducing the cost of the overall system.

The above description is only the embodiments of the present invention and do not limit the patent scope of the present invention. Any equivalent transformations made using the content of the description and drawings of the present invention, or the embodiments directly or indirectly applied in related technical fields, are also included in the scope of patent protection of the present invention.

What is claimed is:

1. A millimeter wave wireless connector chip, comprising a data interface module, a serial-to-parallel conversion module, a millimeter wave transceiving module and a state machine control module, wherein the data interface module, the serial-to-parallel conversion module and the millimeter wave transceiving module are successively connected, and the state machine control module is respectively connected to the serial-to-parallel conversion module and millimeter wave transceiving module;

the data interface module is configured for receiving or sending a data signal;

the serial-to-parallel conversion module is configured for converting a parallel signal into a serial signal and sending the serial signal to a wireless transceiving module, and is also configured for receiving the serial signal sent by the millimeter wave transceiving module and converting the received serial signal into a parallel signal;

the millimeter wave transceiving module is configured for transceiving data by millimeter waves;

the state machine control module is configured for controlling the serial-to-parallel conversion module and the millimeter wave transceiving module to perform data reception, data sending or data dormancy;

the millimeter wave wireless connector chip further comprises a control interface module and a register module, wherein the control interface module is connected to the register module, and the register module is connected to the state machine control module;

the control interface module is configured for receiving or sending a control signal, and the control signal comprises a control signal corresponding to its own chip;

the register module is configured for storing a control signal corresponding to its own chip;

the state machine control module is also configured for performing corresponding configuration according to the control signal in the register module.

2. The millimeter wave wireless connector chip according to claim 1, wherein the control signal further comprises control signals corresponding to other chips;

the millimeter wave wireless connector chip further comprises a judgement and selection module, a bridging module, a packaging module and an unpack distribution module; the control interface module is connected to the judgement and selection module which is respectively connected to the register module and the bridging module; the bridging module is respectively connected to the packaging module and the unpack distribution module; the data interface module is respectively connected to the serial-to-parallel conversion module via the packaging module and the unpack distribution module;

the judgement and selection module is configured for acquiring, from the control signal, a control signal corresponding to the state machine control module of its own chip and sending the same to the register module, acquiring, from the control signal, a control signal corresponding to the control interface module of its own chip and sending the same to the control interface module, and acquiring, from the control signal, a control signal corresponding to other chips and sending the same to the bridging module;

the bridging module is configured for forwarding a control signal;

the packaging module is configured for packaging the control signal and/or the data signal to obtain a parallel signal, and sending the packaged parallel signal to the serial-to-parallel conversion module;

the unpack distribution module is configured for unpacking the parallel signal sent by the serial-to-parallel conversion module to obtain a control signal and/or a data signal, sending the unpacked control signal to the judgement and selection module via the bridging module, and sending the unpacked data signal to the data interface module.

3. A wireless connector, comprising a millimeter wave wireless connector chip, wherein the millimeter wave wireless connector chip comprises a data interface module, a serial-to-parallel conversion module, a millimeter wave transceiving module, a state machine control module, a control interface module and a register module;

the data interface module, the serial-to-parallel conversion module and the millimeter wave transceiving module are successively connected; the state machine control module is respectively connected to the serial-to-parallel conversion module and the millimeter wave transceiving module; the control interface module is connected to the register module which is connected to the state machine control module;

the data interface module is configured for receiving or sending a data signal;

the serial-to-parallel conversion module is configured for converting a parallel signal into a serial signal and sending the serial signal to a wireless transceiving module, and is also configured for receiving the serial signal sent by the millimeter wave transceiving module and converting the received serial signal into a parallel signal;

the millimeter wave transceiving module is configured for transceiving data by millimeter waves;

the state machine control module is configured for controlling the serial-to-parallel conversion module and the millimeter wave transceiving module to perform data reception, data sending or data dormancy;

the control interface module is configured for receiving or sending a control signal, and the control signal comprises a control signal corresponding to its own chip;

the register module is configured for storing a control signal corresponding to its own chip;

the state machine control module is also configured for performing corresponding configuration according to the control signal in the register module.

4. The wireless connector according to claim 3, wherein the control signal further comprises control signals corresponding to other chips;

the millimeter wave wireless connector chip further comprises a judgement and selection module, a bridging module, a packaging module and an unpack distribution module; the control interface module is connected to the judgement and selection module which is respectively connected to the register module and the bridging module; the bridging module is respectively connected to the packaging module and the unpack distribution module; the data interface module is respectively connected to the serial-to-parallel conversion module via the packaging module and the unpack distribution module;

the judgement and selection module is configured for acquiring, from the control signal, a control signal corresponding to the state machine control module of its own chip and sending the same to the register module, acquiring, from the control signal, a control signal corresponding to the control interface module of its own chip and sending the same to the control interface module, and acquiring, from the control signal, a control signal corresponding to other chips and sending the same to the bridging module;

the bridging module is configured for forwarding a control signal;

the packaging module is configured for packaging the control signal and/or the data signal to obtain a parallel signal, and sending the packaged parallel signal to the serial-to-parallel conversion module;

the unpack distribution module is configured for unpacking the parallel signal sent by the serial-to-parallel conversion module to obtain a control signal and/or a data signal, sending the unpacked control signal to the judgement and selection module via the bridging module, and sending the unpacked data signal to the data interface module.

5. A signal transmission system, comprising two millimeter wave wireless connector chips, which are a first millimeter wave wireless connector chip and a second millimeter wave wireless connector chip respectively, and further comprising a first device and a second device, wherein the first device is connected to the first millimeter wave wireless connector chip, and the second device is connected to the second millimeter wave wireless connector chip, and the first millimeter wave wireless connector chip and the second millimeter wave wireless connector chip are wirelessly connected;

the millimeter wave wireless connector chip comprises a data interface module, a serial-to-parallel conversion module, a millimeter wave transceiving module, a state machine control module, a control interface module and a register module;

the data interface module, the serial-to-parallel conversion module and the millimeter wave transceiving module are successively connected; the state machine control module is respectively connected to the serial-to-parallel conversion module and the millimeter wave transceiving module; the control interface module is connected to the register module which is connected to the state machine control module;

the data interface module is configured for receiving or sending a data signal;

the serial-to-parallel conversion module is configured for converting a parallel signal into a serial signal and sending the serial signal to a wireless transceiving module, and is also configured for receiving the serial signal sent by the millimeter wave transceiving module and converting the received serial signal into a parallel signal;

the millimeter wave transceiving module is configured for transceiving data by millimeter waves;

the state machine control module is configured for controlling the serial-to-parallel conversion module and the millimeter wave transceiving module to perform data reception, data sending or data dormancy;

the control interface module is configured for receiving or sending a control signal, and the control signal comprises a control signal corresponding to its own chip;

the register module is configured for storing a control signal corresponding to its own chip;

the state machine control module is also configured for performing corresponding configuration according to the control signal in the register module.

6. The signal transmission system according to claim 5, wherein the control signal further comprises control signals corresponding to other chips;

the millimeter wave wireless connector chip further comprises a judgement and selection module, a bridging module, a packaging module and an unpack distribution module; the control interface module is connected to the judgement and selection module which is respectively connected to the register module and the bridging module; the bridging module is respectively connected to the packaging module and the unpack distribution module; the data interface module is respectively connected to the serial-to-parallel conversion module via the packaging module and the unpack distribution module;

the judgement and selection module is configured for acquiring, from the control signal, a control signal corresponding to the state machine control module of its own chip and sending the same to the register module, acquiring, from the control signal, a control signal corresponding to the control interface module of its own chip and sending the same to the control interface module, and acquiring, from the control signal, a control signal corresponding to other chips and sending the same to the bridging module;

the bridging module is configured for forwarding a control signal;

the packaging module is configured for packaging the control signal and/or the data signal to obtain a parallel signal, and sending the packaged parallel signal to the serial-to-parallel conversion module;

the unpack distribution module is configured for unpacking the parallel signal sent by the serial-to-parallel conversion module to obtain a control signal and/or a data signal, sending the unpacked control signal to the judgement and selection module via the bridging module, and sending the unpacked data signal to the data interface module.

\* \* \* \* \*